(12) United States Patent
Oldham et al.

(10) Patent No.: US 8,254,529 B2
(45) Date of Patent: Aug. 28, 2012

(54) METHOD AND APPARATUS FOR EMERGENCY SERVICES NUMBER ALERTING IN AN INTERNET PROTOCOL NETWORK

(76) Inventors: Eamonn John Oldham, Porter's Lake (CA); Lawrence Maxwell Hicks, Fall River (CA)

(*) Notice: Subject to any disclaimer, the term of this patent is extended or adjusted under 35 U.S.C. 154(b) by 1226 days.

(21) Appl. No.: 12/034,587

(22) Filed: Feb. 20, 2008

(65) Prior Publication Data

US 2009/0207978 A1    Aug. 20, 2009

(51) Int. Cl.
   *H04M 11/04*    (2006.01)
   *H04L 12/26*    (2006.01)
(52) U.S. Cl. .......................... 379/45; 370/252
(58) Field of Classification Search .............. 379/37–51; 455/404.1; 370/352
   See application file for complete search history.

(56) References Cited

U.S. PATENT DOCUMENTS

| | | | |
|---|---|---|---|
| 5,960,061 A * | 9/1999 | Fahie et al. ..................... 379/37 |
| 7,012,994 B2 | 3/2006 | Jung |
| 7,027,564 B2 | 4/2006 | James |
| 7,042,985 B1 | 5/2006 | Wright |
| 7,903,587 B2 | 3/2011 | Poremba et al. |
| 7,903,791 B2 | 3/2011 | Dickinson et al. |
| 7,907,551 B2 | 3/2011 | Croy et al. |
| 7,912,446 B2 | 3/2011 | Zhu et al. |
| 7,929,530 B2 | 4/2011 | Marshall et al. |
| 7,933,385 B2 * | 4/2011 | Dickinson et al. .............. 379/45 |
| 2003/0109245 A1 | 6/2003 | McCalmont et al. |
| 2004/0057425 A1 | 3/2004 | Brouwer et al. |
| 2005/0135569 A1 * | 6/2005 | Dickinson et al. .............. 379/45 |
| 2005/0175166 A1 | 8/2005 | Welenson et al. |
| 2005/0202799 A1 * | 9/2005 | Rollender ................. 455/404.1 |
| 2006/0120517 A1 * | 6/2006 | Moon et al. ..................... 379/45 |

(Continued)

FOREIGN PATENT DOCUMENTS

WO    2006/023190    3/2006

OTHER PUBLICATIONS

PCT/CA2009/000189, International Search Report and Written Opinion, 8 pages, Jun. 2, 2009.

(Continued)

*Primary Examiner* — Davetta W Goins
*Assistant Examiner* — Mohammad Islam
(74) *Attorney, Agent, or Firm* — Dennis R. Haszko

(57) ABSTRACT

A method and apparatus for identification of emergency conditions present at a given geographic location of an Internet Protocol (IP) based device and the subsequent appropriate alerting of an Emergency Services Notification (ESN) telephone number. The method and apparatus serve to monitor an IP packet flow from an IP telephony device and sense a datagram within the packet flow corresponding to an ESN dialing sequence. Upon sensing the ESN dialing sequence, the normal call packet flow is interrupted while IP-based call set-up information is returned as though a normal IP-based call were placed. An ESN call server is then alerted of the ESN dialing sequence and functions to forward the IP packet flow to a Public Safety Answering Point (PSAP) appropriate to the IP telephony device along with location information corresponding to a civic address at which the IP telephony device is located.

22 Claims, 5 Drawing Sheets

U.S. PATENT DOCUMENTS

| | | | |
|---|---|---|---|
| 2006/0193447 A1* | 8/2006 | Schwartz | 379/45 |
| 2006/0293024 A1* | 12/2006 | Benco et al. | 455/404.2 |
| 2007/0060097 A1* | 3/2007 | Edge et al. | 455/404.1 |
| 2007/0242660 A1* | 10/2007 | Xu | 370/352 |
| 2007/0253429 A1* | 11/2007 | James | 370/395.42 |
| 2008/0013523 A1* | 1/2008 | Nambakkam | 370/352 |
| 2008/0065775 A1* | 3/2008 | Polk | 709/228 |
| 2008/0081646 A1* | 4/2008 | Morin et al. | 455/466 |
| 2009/0003535 A1* | 1/2009 | Grabelsky et al. | 379/45 |

OTHER PUBLICATIONS

Schulzrinne et al., "Emergency Sevices for Internet Telephony Systems," Network Working Group, XP015035061, ISSN: 0000-0004, Feb. 8, 2004, 22 pages.

European Search Report from EPO application EP 09 71 1975, dated Mar. 14, 2012, 7 pages.

New Zealand Intellectual Property Office, Examination Report from NZ Application No. 586816, dated Feb. 29, 2012, 1 page.

* cited by examiner

METHOD AND APPARATUS FOR EMERGENCY SERVICES NUMBER ALERTING IN AN INTERNET PROTOCOL NETWORK

FIELD OF THE INVENTION

The present invention relates generally to electronic communications related to Internet Protocol (IP) based telephony and messaging. More particularly, the present invention relates to the identification of emergency conditions present at a given geographic location of a voice over IP (VoIP) device and the subsequent appropriate alerting of an emergency services notification (ESN) telephone number.

BACKGROUND OF THE INVENTION

Throughout the world, emergency services have been the subject of widespread standardization for many years. Telephone subscribers in particular have benefited from such standardization via the establishment of Emergency Services Notification (ESN) systems. Within North America, the prevalent ESN system is standardized on the dial sequence 911. Still other jurisdictions have selected a diversity of alternative sequences, although the purpose of each ESN system is to quickly and reliably call for assistance when an emergency occurs. Telephone users may therefore call for any type of emergency assistance by dialing the ESN telephone number from within the geographic area served by the ESN system. In order for this service to be available, the Public Switched Telephone Network (PSTN) supplier in the area must route all such calls to an appropriate call answering center. Such call answering centers are often municipal offices such as a police department dispatch.

Original ESN systems simply detected the ESN dialing sequence (e.g., 911) and routed the emergency telephone call to a special answering point. No subscriber information or high-priority call handling was included in these earlier ESN systems. However, many ESN system operators quickly realized that the most critical information required of the caller was his or her location. Under such ESN systems, there was no way to quickly dispatch assistance when the nature of the emergency precluded passing that information to the answering point, Many jurisdictions have since installed enhanced systems that include technologies for reporting the calling party's Directory Number (DN) directly to the call answering center which are typically referred to as a Public Safety Answering Point (PSAP). Via a mechanism known as Automatic Number Identification/Automatic Location Identification (ANI/ALI), whereby DN information is cross-referenced to a location database that identifies the geographical location of the calling party requiring assistance. ANI/ALI is a mechanism that aligns a specific telephone DN to a physical resource such as a port or connection. The physical resource is then cross-referenced to the geographical location data or civic address. Thus, the ANI/ALI mechanism is used to determine which PSAP has jurisdiction by cross-referencing the civic address to the responsible agency whereby the DN information is used by the PSAP to dispatch the emergency services crew to the caller's location.

Accuracy of the location database depends on a consistent and rigorously applied Civic Addressing System (CAS) to supply a unique address for each possible originating telephone number. In reality, the CAS is often inaccurate. This is especially true in situations involving users that cannot effectively participate in the ESN system due to their Private Branch Exchange (PBX) telephone systems having no practical way to report location information to the PSTN. For example, a commercial, industrial, educational, or governmental institution may have hundreds of telephony devices located in various buildings over a wide geographic area, and yet a "911 call" from any of them may identify only one location.

Moreover, existing ANI/ALI mechanisms typically depend upon a one-to-one correspondence of a physical resource to each DN entry. As suggested above in regard to PBX telephone systems, the basic emergency function of any such ESN system fails when multiple DN entries are associated with a single resource such as a phone system element such as a PBX acting as a concentrator for multiple telephone instruments to telephone trunk circuits. The emergence of Internet Protocol (IP) based telephony has further exacerbated the ANI/ALI issue within ESN systems. IP telephony uses a packet switched architecture that allows users to share the communications resource in an efficient manner via Voice over IP (VoIP) technology. As in the PBX scenario, the sharing of a physical channel by a VoIP device means there is no one-to-one correspondence of a physical resource to a DN entry. Accordingly, ESN system failure is also present within situations where the calling party uses a VoIP device to place the emergency services call. In such instances, a single DN entry may be associated with a single resource such as the VoIP telephony, but the nature of VoIP telephony often precludes accurate identification of the geographic location of the user in need of emergency assistance.

IP telephony providers have adopted a number of stopgap measures to provide a semblance of reliability to ESN systems. Most often, such IP telephony providers simply require their customers to read and agree to a liability waiver which describes the ESN system as based on the address that the customer provides on sign-up for the VoIP service. This method depends on: (a) the accuracy of the address as reported by the user; (b) a static user; and, (c) co-operation of the ESN system's PSAP. This latter issue is problematic because many jurisdictions have legislation precluding any auto-dialer mechanism to place an ESN call. IP telephony providers therefore often use call centers for handling emergency calls.

IP telephony provider call centers function such that an emergency call placed on the VoIP service is redirected to the call center where a human operator ascertains the nature of the call and whether the caller is located at the reported address. The human operator at the call center then forwards the emergency call to a predesignated PSAP. However, often such emergency calls are forwarded from the IP telephony provider's call center and sent to an administrative, supervisor, or general purpose telephone line where the answering party is not a trained ESN call-taker. With no presumed urgency associated with the line, emergency calls may ring many times before being answered or may not be answered at all. Even after being answered, the situation must be explained to the answering party before it is forwarded to a call taker in the PSAP.

Another known stopgap solution involves maintaining a traditional telephone service line at each user's location. A device is used to sense the dialing of the ESN dialing sequence by a VoIP device. The VoIP device then goes off line and dials the ESN dialing sequence on the traditional telephone circuit—e.g., a plain old telephone service (POTS) line. The IP-based audio is then routed to the PSAP via the POTS line connection. This solution is less than desirable because it requires the traditional circuit just to maintain the location capabilities of the ESN system.

As mentioned above, the inherent nature of VoIP telephony often precludes accurate identification of the geographic location of the user in need of emergency assistance. One of the significant advantages of IP telephony is the ability for a mobile user to receive "dial tone" from their home location regardless of where the mobile user might be located worldwide. This mobility, when tied with the advanced services granted by IP telephony, provides a powerful motivator for both business and personal users to adopt the new technology. However, IP telephony mobility often confounds the stopgap measures put into place by the IP telephony providers to address ESN system concerns. Although efforts are being undertaken to try to trace the VoIP user's location through the network, there have been inherent difficulties due to the changeability of the worldwide IP network including diverse security measures to overcome sophisticated spoofing and other attacks aimed at disrupting normal network operations.

As traditional telephone circuits continue to give way to advanced IP-based technologies, the public's confidence in ESN systems will be diminished unless the problematic aspects discussed above are resolved. The ideal solution will enable the existing PSAP architectures to be maintained and enhanced. Moreover, the emergence of IP telephony, including specifically VoIP, as a mainstream communications method for use by members of the public at their residences has highlighted the need for such services to implement effective ESN system services (e.g., 911 services). Without an effective method to implement ESN services, it is likely that the various national communications authorities who are ultimately responsible for ESN notification within their given jurisdictions not will allow the widespread implementation of IP telephony. There exists, therefore, a need to supplement existing emergency response tools within the context of VoIP technologies to more effectively direct emergency responders to an actual emergency location.

SUMMARY OF THE INVENTION

It is an object of the present invention to obviate or mitigate at least one disadvantage of previous solutions for notification of emergency conditions present in residential, commercial, institutional, or industrial settings as determined by detection of the appropriate emergency services notification (ESN) telephone number. Moreover, it is an object of the present invention to provide identification of emergency conditions present at a given geographic location of a VoIP device and provide for the subsequent appropriate ESN alerting. The present invention seeks to facilitate installation coincidental with the installation of an IP modem or interconnection device.

In a first embodiment, there is provided a method of emergency alerting within an IP network, the method including: monitoring an IP packet flow from one or more IP telephony devices; sensing a datagram within the IP packet flow corresponding to an ESN dialing sequence; upon sensing the ESN dialing sequence, interrupting normal packet flow from the IP telephony device to an IP telephony service provider; returning IP-based call setup information to the IP telephony device; notifying an ESN call server that the ESN dialing sequence has been sensed; and forwarding the IP packet flow to a PSAP appropriate to the IP telephony device along with location information corresponding to a civic address at which the IP telephony device is located.

In a further embodiment, there is provided an apparatus for emergency alerting within an IP network, the apparatus including: an ESN enabling device that monitors an IP packet flow from one or more IP telephony devices and senses a datagram within the packet flow corresponding to an ESN dialing sequence, the ESN enabling device interrupts normal call flow from the IP telephony device to an IP telephony service provider when the ESN dialing sequence is sensed and returns normal call set-up information to the IP telephony device; and an ESN call server located remote from the ESN enabling device, the ESN call server accepts notification from the ESN enabling device that the ESN dialing sequence has been sensed and forwards via a communications channel the IP packet flow to a Public Safety Answering Point (PSAP) appropriate to the IP telephony device along with location information corresponding to a civic address at which the IP telephony device is located.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention provides a method and apparatus for the identification of emergency conditions present at a given geographic location of an IP based device and the subsequent appropriate alerting of an ESN system. While the present invention is discussed in terms of a specific IP technology in the form of VoIP telephony, it should be understood that any packet based technology may benefit from the present invention without straying from the intended scope of the claims.

In general, the present method and apparatus for ESN alerting over an IP network can be embodied in a few different ways. The present invention can be configured such that the IP telephony device (e.g., VoIP telephone) at the user location is "spoofed" into acting as though the IP telephony device is in communication with the IP service provider when, in fact, it is in communication with the PSAP point. Alternatively, the present invention can be configured such that the IP service provider itself is spoofed into acting as though the IP service provider is communicating via a normal IP phone call when, in fact, communications are re-routed such that the IP service provider is in communication with the PSAP point. This latter configuration has the further advantage of not requiring the IP telephony device to be aware of the authentication format used by the IP service provider. Instead, the IP service provider sees an ESN call as if it were a normal call that has been call forwarded to another number. Still further, these two spoofing configurations can be provided to function close to the user as an attachment to the IP telephony device communications line or, alternatively, at the IP network edge (e.g., at the Internet connectivity level such as with a Digital Subscriber Line (DSL), a T1 digital signal line, or the Data Over Cable Service Interface Specifications (DOCSIS) level as part of a modem or similar Internet connectivity device.

Figure 1:
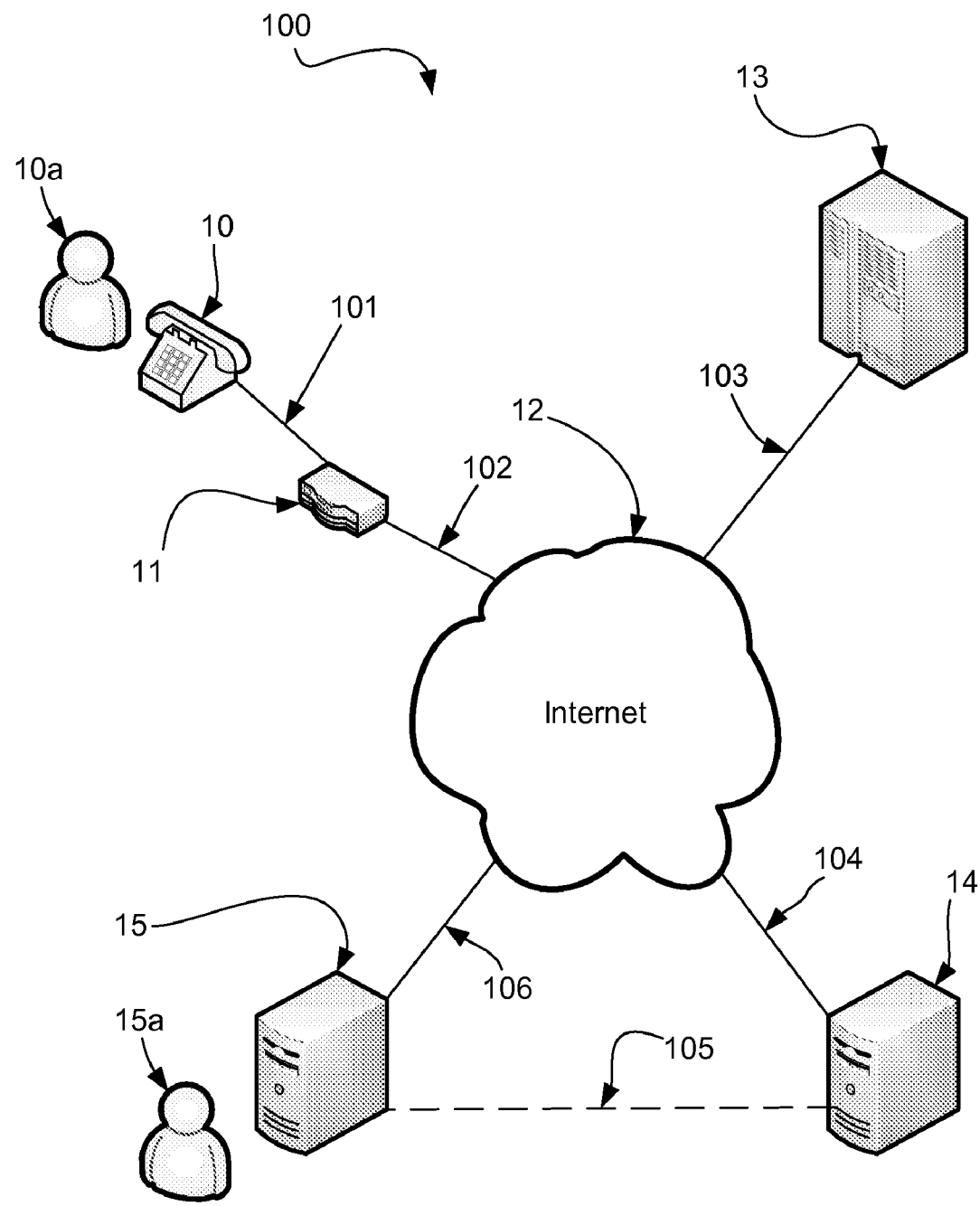
FIG. 1 is a generalized network schematic in accordance with an embodiment of the present invention.
Figure 1A:
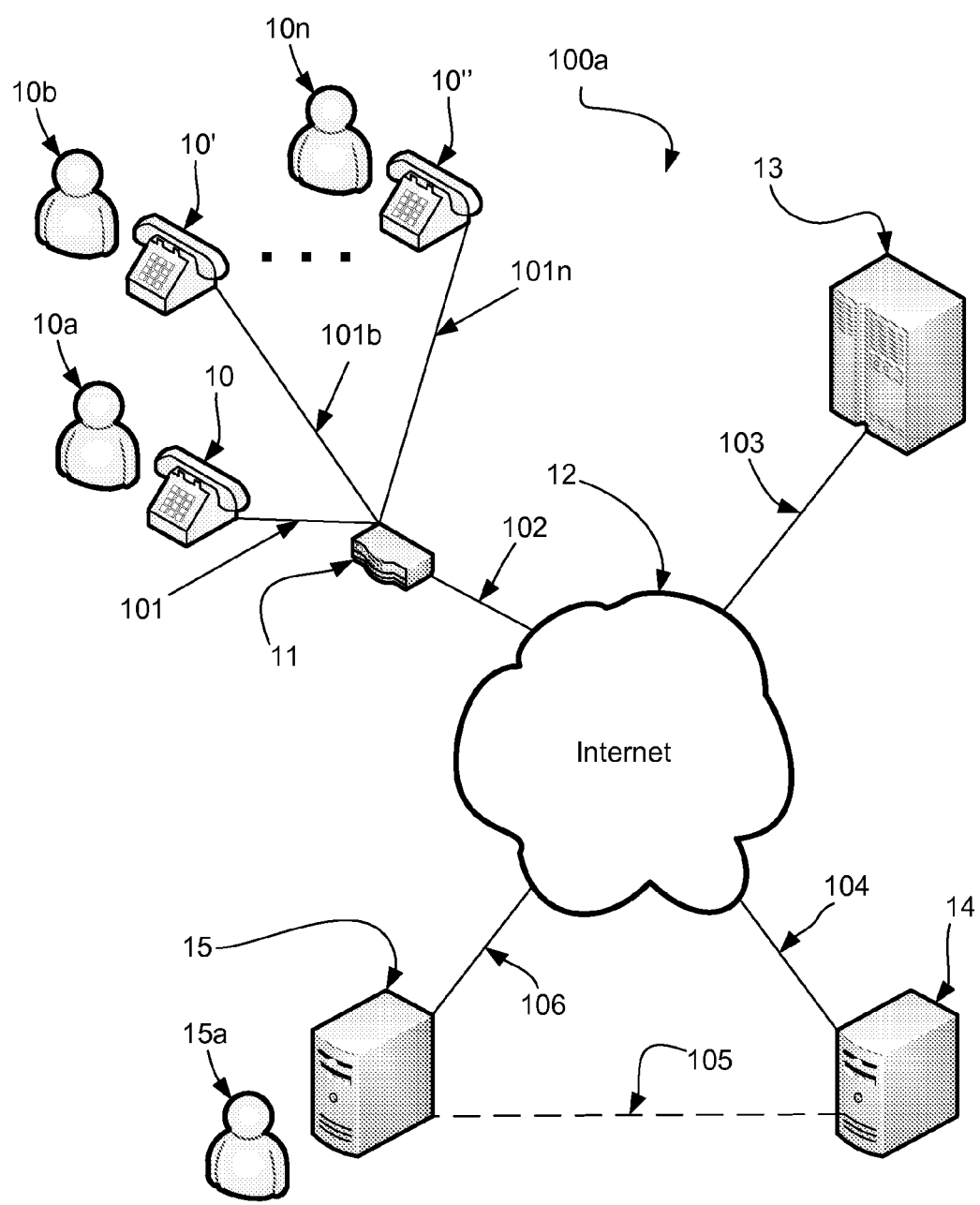
FIG. 1a is a generalized network schematic in accordance with another embodiment of the present invention.

With reference to FIG. 1, a generalized network schematic 100 in accordance with an embodiment of the present invention is shown. An end-user 10a utilizing an IP telephony device 10 is connected to the public Internet 12. In accordance with the present invention, an ESN enabling device 11 is inserted between the IP telephony device 10 and the public Internet 12. More specifically, the ESN enabling device 11 is operatively connected in some suitable manner to the IP telephony device 10 by a connection mechanism 101. A similar embodiment is shown by way of FIG. 1a in which a plurality of users 10a, 10b, . . . 10n (where n is an integer) using a plurality of respective IP telephony devices 10a, 10', 10", are connected to the ESN enabling device 11 by respective connection mechanisms 101, 101b, 101n. Thus, a single ESN enabling device 11 may be connected to multiple users. Both FIG. 1 and 1a function similarly and are therefore described further by like reference numbers. The connection mechanism 101 may be a known type of cabling, such as, but not limited to, typical category 5, 5e, or 6 Ethernet cables with RJ45 ends. Although such cabling is discussed, it should further be noted that the ESN enabling device 10 in accordance with the present invention may be connected to the IP telephony device 10 in some other wired or wireless manner, or alternatively, may be integrated into the IP telephony device 10 without straying from the intended scope of the invention.

The ESN enabling device 10 is operatively connected to the public Internet 12 by an IP network interface 102. The interface 102 may be any wired or wireless manner of accessing the public Internet 12. Moreover, interface 102 may include one or more elements such as, but not limited to, any standard modem, cable modem, wireless modem, or any intervening local area network or high speed access mechanism. Still further, it should be noted that the ESN enabling device 10 in accordance with the present invention may be integrated into any such elements within the interface 102 such as, but not limited to, integration within a cable modem.

As previously mentioned, it should be understood that the ESN enabling device 10 may be constructed integral with or as an attachment to the connection mechanism 101 or, alternatively, may be constructed as part of a modem or similar Internet connectivity device within interface 102 at the IP network edge (e.g., at the DSL, T1, or DOCSIS level). Regardless of whether the ESN enabling device 10 is a standalone device (e.g., a "dongle") or whether integrated within the IP telephony device 10 or within any elements within the interface 102, the ESN enabling device 10 in accordance with the present invention is embodied within computer software in some manner of integrated chip hardware such as, but not limited to an application specific integrated chip (ASIC) implementation.

As further shown in FIG. 1, an IP telephony service provider 13 is operatively connected to the IP telephony device 10 via cabling 101, the ESN enabling device 11, the IP network interface 102, and the public Internet 12, and a service provider interface 103 connecting the IP telephony service provider 13 to the public Internet 12 in a known manner. Operation of the IP telephony by the IP telephony service provider 13 is known within the VoIP art and will not be further discussed herein as such is beyond the scope of the present invention.

In accordance with the present invention, when the ESN enabling device 11 is initially installed at a particular physical location or moved to a new geographic location, the ESN enabling device 11 cannot become active until the ESN enabling device 11 is approved by an ESN call server 14. The ESN call server 14 is operatively coupled to the ESN enabling device 11 via the network interface 102, public Internet 12, and an ESN call server interface 104 connecting the ESN call server 14 to the public Internet 12 in a known manner. The ESN call server 14 is selectively in communication with a PSAP 15 to which all emergency calls are selectively routed via communications channel 105 as described further herein below. Such communication between the ESN call server 14 and the PSAP 15 may be accomplished in any wired or wireless manner where each may be relatively near or remote from one another. Such communication details may vary without straying from the intended scope of the present invention and are not further described herein as such communication details should be readily apparent to one of skill in the networking art.

As can further be seen from FIG. 1, the PSAP 15 is operatively connected to the ESN call server 14 via a communications circuit 105 that may be a plurality circuits any of which that will carry voice traffic received by the ESN Call Server 14 from the IP telephony provider 13 which is the re-directed call from the IP telephony device 10 carried via the Internet interface 103, the public Internet 12, and the ESN call server IP interface 104. In addition to the plurality of communications circuits 105, the PSAP 15 may be connected via a private or public Internet connection 106 to the ESN call server 14 for the purposes of receiving the civic address information pertaining to the user. Alternatively, such civic address information may be sent via the plurality of communications circuits 105 using such communications mechanisms as would be apparent to a skilled worker of the telephone arts.

The activation process mentioned above that occurs either during initial installation of the ESN enabling device 11 or during subsequent "re-installation" when the ESN enabling device 11 is moved to a new geographic location requires that the installer of the ESN enabling device 11 provide the proper civic address to the ESN call server 14. While the installer may be the VoIP user 10a, typically the ESN enabling device will be installed by a qualified service technician who installs the VoIP equipment for the VoIP user 10a. After such installation process is complete, the ESN enabling device 11 then becomes active. The proper PSAP assignment is determined from the Civic Address reported by the installer whereby each Civic Address has been allocated to a specific PSAP by the agency who is responsible for ESN services in the jurisdiction of operation. The allocation of specific PSAP agencies to particular Civic Addresses is outside the scope of the present invention.

In normal VoIP operation, when the user 10a of the IP telephony device 10 wishes to place a telephone call, such user 10a enters an appropriate telephone number using the known mechanisms (e.g., touch-tone dial pad) provided for within the IP telephony device 10. The entered information causes the IP telephony device 10 to form one or more datagram packets which are submitted to the public Internet 12 via cabling 101, the ESN enabling device 11, and the IP network interface 102. The datagram packets are routed to the IP telephony service provider 13 where the information is used to instigate a circulation of unacknowledged packets between the calling and called parties. It should be readily apparent that the called parties are operatively connected to the IP telephony service provider 13 in a manner similar to the user 10a of the IP telephony device 10. Such circulation of unacknowledged packets between the calling and called parties is accomplished using a protocol that supports fast unacknowledged voice packet transmission such as Real-time Transport Protocol (RTP) which is a prevalent protocol that defines a standardized packet format for delivering audio and video over the Internet. This establishes a two way telephone conversation over the Internet using IP.

In one embodiment of the present invention, the IP telephony service provider 13 typically implements diverse validation and security processes and messages to qualify the user 10a for service provision. The ESN enabling device 11 can be configured to pass all such validation processes and messages transparently so as not to interfere with normal qualification and messaging. The ESN enabling device 11 includes a mechanism embodied in software (e.g., within the ASIC design as described above) whereby ESN dial strings are recognized and properly formed call re-direction messages can be sent to the IP telephony service provider 13 via the public Internet 12 and associated interfaces. Such re-direction messages are controlled by the ESN Call Server 14.

In another embodiment, as is normal and customary, the IP telephony service provider 13 typically implements a sophisticated user validation process to ensure that users are qualified to make use of the VoIP service provided by the IP telephony service provider 13. Such validation processes are most often proprietary to the individual IP telephony service provider 13. The ESN enabling device 11 includes a mechanism embodied in software (e.g., within an ASIC as described above) to sense the validation process and related data exchange between the IP telephony device 10 and the IP telephony service provider 13. The ESN enabling device 11 uses the information within this data exchange to enable the handling of emergency requests (i.e., ESN calls).

When the user 10a of the IP telephony device 10 enters an ESN dialing sequence, such as "911" which is used in North America, the ESN enabling device 11 senses the specific datagram related to that dialing sequence and interrupts the normal datagram packet flow to the IP telephony service provider 13. The ESN enabling device 11 returns call setup information datagram packets to the IP telephony device 10 such that the instrument sees the expected sequence as if from the IP telephony service provider 13. Simultaneously, the ESN enabling device 11 sends information to the ESN call server 14 indicating that the ESN dialing sequence has been received by the ESN enabling device 11. The ESN call server 14 recognizes the unique digital address associated with the ESN enabling device 11. The ESN call server 14 then cross-references this digital address information to the appropriate stored PSAP and civic address related to the ESN enabling device 11 that was stored at initial, or subsequent, validation of the ESN enabling device 11.

Once the ESN call server 14 has validated the ESN call, the ESN call server 14 sends a datagram message to the ESN enabling device 11 instructing it to send a re-direction message to the IP telephony service provider 13. The re-direction message includes the telephone DN number to which the call is re-directed. The IP telephony service provider 13 makes an outbound call to the designated DN number which is affiliated with the ESN call server 14. The ESN call server 14, which has been pre-notified to expect the incoming call via a datagram message from the ESN enabling device 11, answers the incoming call, validates it, and then connects the call through to one of the plurality of communications circuits 105 connected to the PSAP 15. Depending on the type of communications circuits equipped, the ESN call server 14 simultaneously sends the civic address information over the communications circuits 105 in a prescribed format expected by the PSAP 15 or the civic address information is delivered by data communications services which would be apparent to any skilled worker of the telecommunications arts.

It should be understood that the communications channel 105 delivers the ESN location information and telephone audio in a manner that is equivalent to the PSAP's previously established method of receiving ESN telephone audio. In North America, the mechanism by which the communications channel 105 functions will typically be via an Integrated Services Digital Network (ISDN) telephony service. Alternatively, the present invention may utilize tie trunks, IP Telephony, microwave links, or any other suitable mechanism in order to deliver the ESN telephone audio and location information to the PSAP 15 in an accurate real-time manner. Generally speaking however, the PSAP 15 receives the ESN location information and audio call in the same established manner as it receives calls from any POTS telephone instrument. Accordingly, the present invention permits a PSAP emergency operator 15a to receive the VoIP user's civic address in the same manner as POTS callers. Moreover, there need be no special procedure or special training associated with VoIP users. Two-way telephone audio proceeds in a normal fashion, and the PSAP emergency operator 15a handles the call in their normal manner.

Upon conclusion of the ESN call, the ESN enabling device 11 returns to normal operation wherein it passes IP telephony datagram packets to the IP telephony service provider 13. Advantageously, there are no special operations required of the VoIP user for either incurring an ESN call or to re-establish normal operation of their IP telephony service.

The present invention may also include diagnostics capabilities such that the ESN call server 14 operator has the ability to maintain and test the ESN enabling device 11 remotely via network connectivity from the location of the ESN call server 14. The ESN call server 14 will implement regular, time-based diagnostic tests that will measure the performance of the network connection between it and the ESN enabling device 11. In addition, internal diagnostic tests within the ESN enabling device 11 will continuously test the integrity of the device. All detected issues are reported via the Internet 12 to the ESN call server 14 where they are captured in a diagnostics file and displayed at a technician's desk. The technician can thereafter take remedial action to address the issue typically before the ESN enabling device 11 is ever called into service.

Figure 2:
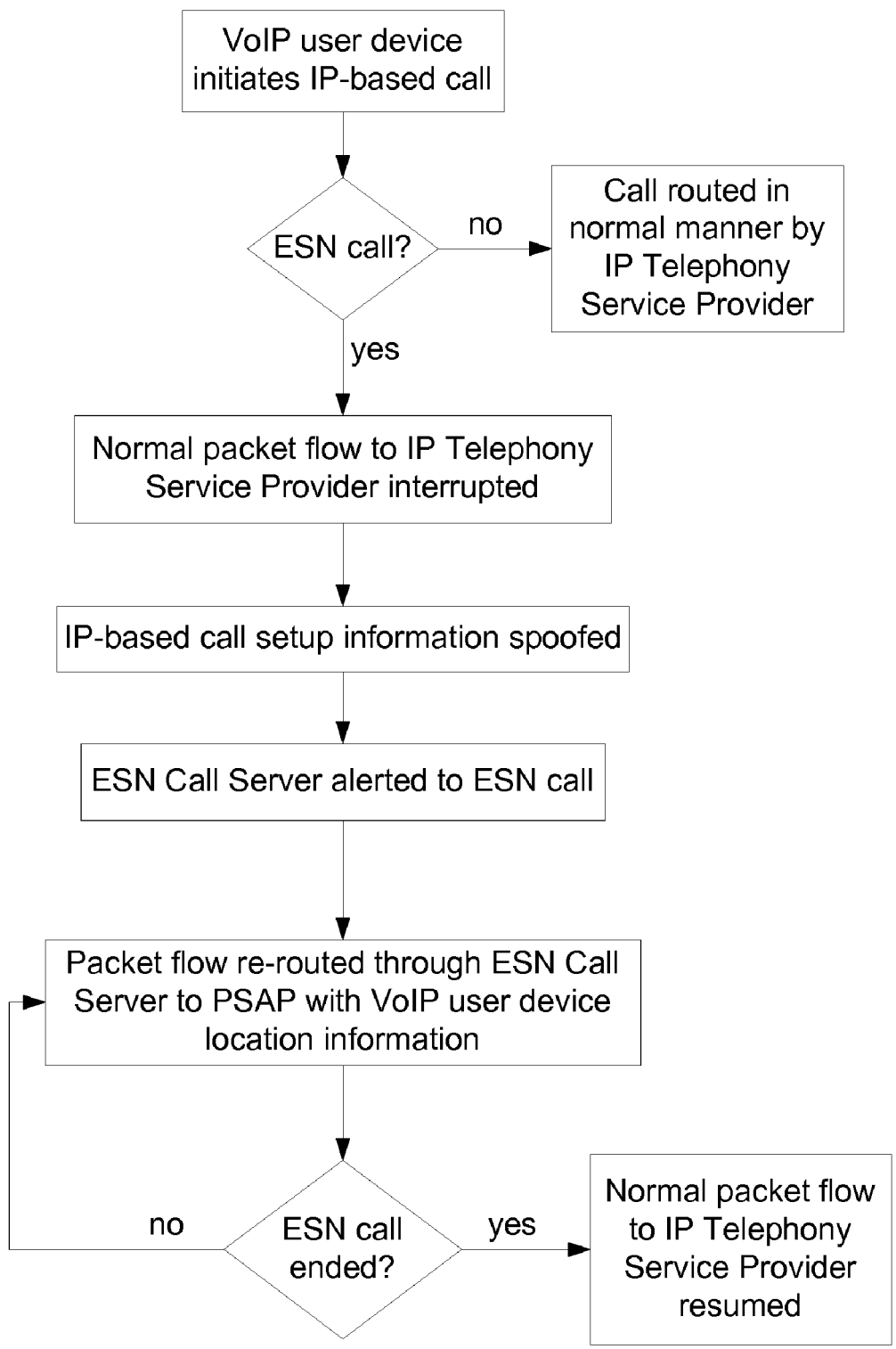
FIG. 2 is a flowchart establishing the general procedure incurred in accordance with the method of the present invention.

With regard to FIG. 2, there is shown a generalized flowchart establishing the procedure incurred in accordance with the method of the present invention. While specific steps are illustrated, it should be readily apparent that alternative steps or order of steps may occur without straying from the intended scope of the present invention.

Figure 2A:
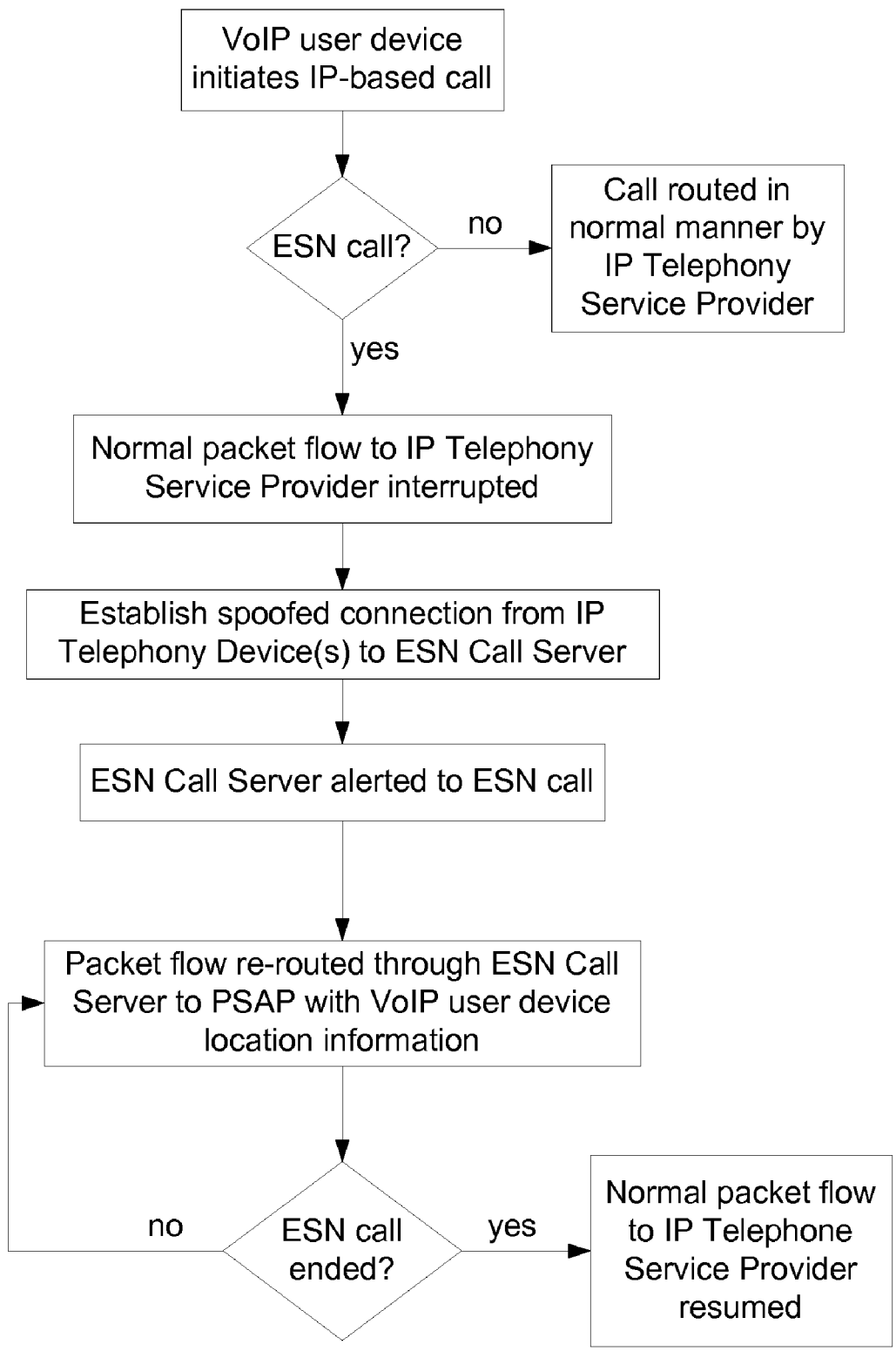
FIG. 2a is a block diagram showing a first implementation in accordance with the method of the present invention.
Figure 2B:
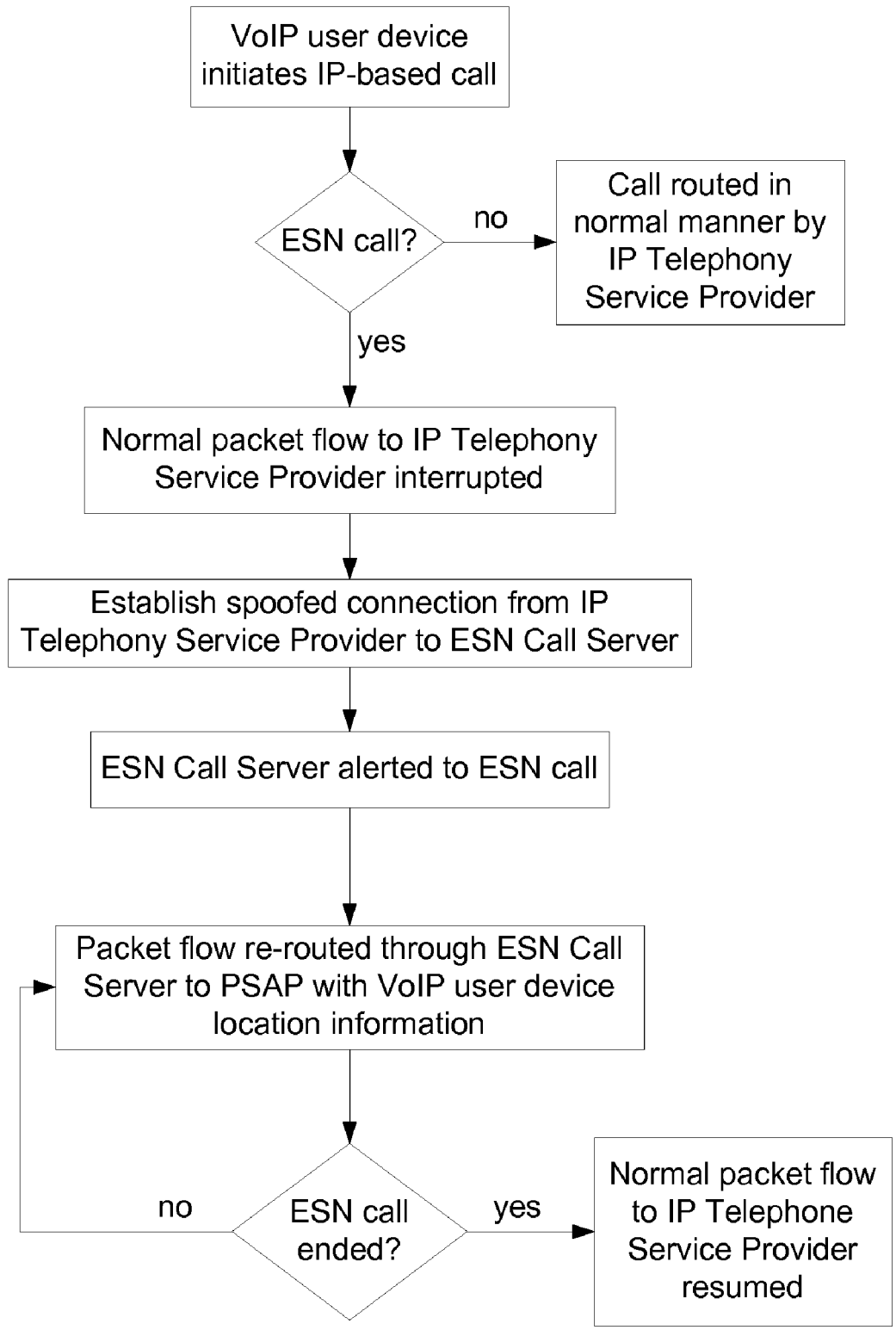
FIG. 2b is a block diagram showing a second implementation in accordance with the method of the present invention.

Initially, the IP telephony device 10 will initiate an IP-based call in the normal manner known in the art. That is to say, the user 10a will input a key sequence to initiate a phone call. Such call will be determined either as a regular VoIP call to another telephony user and routed in the normal manner by the IP telephony service provider 13 or, alternatively, determined as an ESN call. Such determination is made by way of the ESN enabling device 11 determining that the particular ESN dialing sequence has been entered by the user 10a. Upon determination that the call is an ESN call, the normal packet flow from the IP telephony device 10 to the IP telephony service provider 13 is interrupted by the ESN enabling device 11. Thereafter, IP-based call setup information is spoofed by way of the present invention such that (as seen in FIG. 2a) a connection from the IP telephony device 10a or devices 10a, 10b, . . . 10n is established to the ESN call server 14, or such that (as seen in FIG. 2b) a connection from the IP telephony service provider 13 is established to the ESN call server 14

More specifically, the ESN enabling device 11 sends a datagram message to the ESN call server 14 alerting it to the fact that the present ESN call will be redirected to it from the specific civic address associated to the device. The datagram message contains the civic address as well as the responsible PSAP. Alternatively, the civic address and responsible PSAP information may be maintained in a database (not shown) associated to the ESN call server 14 in which case the specific IP address associated with the ESN enabling device 11 acts as an index to retrieve the information. This datagram message is acknowledged by the ESN call server 14 and a 'go-ahead' datagram message is returned to the ESN enabling device 11. The 'go-ahead' message includes a specific DN number to which the ESN call server 14 expects the present ESN call to be placed.

Once the 'go-ahead' datagram message has been received by the ESN enabling device 11, the ESN enabling device 11 forms a datagram message addressed to the IP telephony service provider 13 that informs that IP telephony service provider 13 to forward all datagram packets received from the IP user's IP telephony device 10 to the DN number provided by the datagram message returned from the ESN call server 14 as indicated above. When the IP telephony service provider 13 receives the datagram message, IP telephony service provider 13 forms a call to the DN number prescribed by the message. The call is placed via the normal operative IP network. The call is detected by the ESN call server 14 as an inbound call on the expected DN. Further, where such facilities are provided by the IP telephony service provider 13, the incoming call may contain validation of the originating caller's DN.

The ESN call server 14 determines which of a plurality of PSAP connections is appropriate for the present call and sends the caller's civic address using the method that has been established for the particular PSAP. In this manner, a plurality of PSAP connections can be serviced using a plurality of communications methods. Once the civic address has been successfully dispatched to the PSAP 15, the ESN call server 14 begins to stream VoIP audio from the incoming port through the server to the outbound PSAP communications circuit 105. The PSAP operator 15a handles the ESN call from the IP connected user 10a in the same manner as any other ESN call The re-routing of the packet flow from the user 10a to the emergency services operator 15a will of course continue for the duration of the ESN call. Upon cessation of the ESN call, normal packet flow to the IP telephony service provider 13 will thus resume in a seamless manner and transparent to either the user 10a or the emergency services operator 15a.

It should be understood that present invention includes several advantageous characteristics including the fact that the ESN enabling device 11 resides at the edge of the IP network. In this manner, the ESN enabling device 11 is physically associated with the civic address, rather than making attempts to discover the civic address by manipulating various aspects of the IP network. Accordingly, the present invention is similar to the traditional ESN methodology in which a corresponding civic address is associated with a physical resource (i.e., a copper wire connection). The ESN enabling device 11 also uniquely controls the remote endpoint of a normal VoIP connection to the IP telephony device 10, while in fact communicating with the ESN call server 14 and redirecting recovered voice signals via the communications channel 105 to the PSAP 15. This mechanism maintains proper operation of the IP telephony device 10 even though ESN call traffic is re-directed to the ESN call server 14 and appropriate PSAP 15. Still further, the present invention advantageously works with existing PSAP operations such that no changes to either the PSAP network's connections nor to the training and standard operating procedures used by the PSAP operators are required to handle ESN calls from IP telephony device 10.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of emergency alerting within an Internet Protocol (IP) network, said method comprising:
   monitoring an IP packet flow from one or more IP telephony devices;
   sensing a datagram within said IP packet flow corresponding to an Emergency Services Notification (ESN) dialing sequence;
   upon sensing said ESN dialing sequence, interrupting normal packet flow from said IP telephony device to an IP telephony service provider;
   returning IP-based call setup information to said IP telephony device;
   notifying an ESN call server that said ESN dialing sequence has been sensed; and
   forwarding said IP packet flow to a Public Safety Answering Point (PSAP) appropriate to said IP telephony device along with location information corresponding to a civic address at which said IP telephony device is located.

2. The method as claimed in claim 1 wherein said step of returning IP-based call setup information further includes establishing a connection from said IP telephony device to said ESN call server.

3. The method as claimed in claim 1 wherein said step of returning IP-based call setup information further includes establishing a connection from said IP telephony service provider to said ESN call server.

4. The method as claimed in claim 1 wherein said packet flow includes Voice over Internet Protocol (VoIP) datagrams.

5. The method as claimed in claim 1 wherein said sensing is accomplished by way of an ESN enabling device resident at a network edge near to said IP telephony device.

6. The method as claimed in claim 1 wherein said forwarding is accomplished by way of said ESN call server.

7. The method as claimed in claim 6 wherein said ESN call server is resident at a network edge remote from said IP telephony device.

8. The method as claimed in claim 7 wherein said location information corresponding to said civic address at which said IP telephony device is located is stored within said ESN call server.

9. The method as claimed in claim 8 wherein said location information is predetermined prior to storage within said ESN call server.

10. The method as claimed in claim 8 wherein said sensing is accomplished by way of an ESN enabling device resident at a network edge near to said IP telephony device, and said location information is predetermined by a user of said IP telephony device and stored by said user by way of said ESN enabling device.

11. The method as claimed in claim 1 wherein said PSAP appropriate to said IP telephony device relative to said civic address at which said IP telephony device is located is predetermined by a user of said IP telephony device and stored with said civic address by said user by way of said ESN enabling device.

12. The method as claimed in claim 1 wherein said forwarding of said IP packet flow to said PSAP occurs via an Integrated Services Digital Network (ISDN) telephony service line.

13. An apparatus for emergency alerting within an Internet Protocol (IP) network, said apparatus comprising:
an Emergency Services Notification (ESN) enabling device that monitors an IP packet flow from one or more IP telephony devices and senses a datagram within said packet flow corresponding to an ESN dialing sequence, said ESN enabling device interrupts normal call flow from said IP telephony device to an IP telephony service provider when said ESN dialing sequence is sensed and returns normal call set-up information to said IP telephony device; and
an ESN call server located remote from said ESN enabling device, said ESN call server accepts notification from said ESN enabling device that said ESN dialing sequence has been sensed and forwards via a communications channel said IP packet flow to a Public Safety Answering Point (PSAP) appropriate to said IP telephony device along with location information corresponding to a civic address at which said IP telephony device is located.

14. The apparatus as claimed in claim 13 wherein said ESN enabling device returns said normal call set-up information to said IP telephony device by establishing a connection from said IP telephone device to said ESN call server.

15. The apparatus as claimed in claim 13 wherein said ESN enabling device returns said normal call set-up information to said IP telephony device by establishing a connection from said IP telephone service provider to said ESN call server.

16. The apparatus as claimed in claim 13 wherein said packet flow includes Voice over Internet Protocol (VoIP) datagrams.

17. The apparatus as claimed in claim 13 wherein said ESN enabling device is resident at a network edge near to said IP telephony device.

18. The apparatus as claimed in claim 13 wherein ESN call server stores said location information corresponding to said civic address at which said IP telephony device is located.

19. The apparatus as claimed in claim 13 wherein said location information is predetermined by a user of said IP telephony device and stored by said user by way of said ESN enabling device.

20. The apparatus as claimed in claim 13 wherein said PSAP appropriate to said IP telephony device relative to said civic address at which said IP telephony device is located is predetermined by a user of said IP telephony device and stored with said civic address by said user by way of said ESN enabling device.

21. The apparatus as claimed in claim 13 wherein said communications channel is Integrated Services Digital Network (ISDN) telephony service line.

22. The apparatus as claimed in claim 13 wherein said communications channel is a suitable mechanism for delivering ESN telephone audio and location information to said PSAP in an accurate, real-time manner selected from a group of mechanisms including tie trunks, IP telephony, and microwave links.

\* \* \* \* \*